(No Model.) 3 Sheets—Sheet 1.

G. M. BOWSER.
MACHINE FOR MOLDING AND DRESSING STONE FOR BUILDINGS, &c.

No. 577,003. Patented Feb. 16, 1897.

Witnesses
Percy T. Griffith
E. M. Clark

George M. Bowser
Inventor
by Edgar Tate & Co
Attorneys (No Model.)  3 Sheets—Sheet 2.

G. M. BOWSER.
MACHINE FOR MOLDING AND DRESSING STONE FOR BUILDINGS, &c.

No. 577,003.  Patented Feb. 16, 1897.

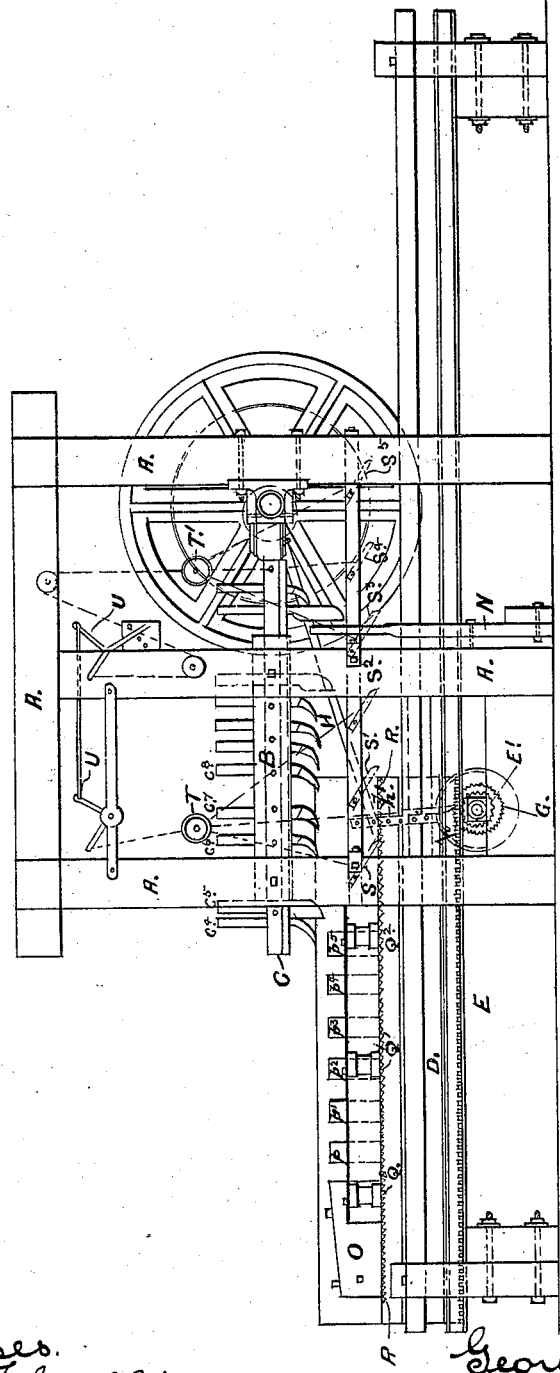

UNITED STATES PATENT OFFICE.

GEORGE MONTAGUE BOWSER, OF BRISBANE, QUEENSLAND.

MACHINE FOR MOLDING AND DRESSING STONE FOR BUILDINGS, &c.

SPECIFICATION forming part of Letters Patent No. 577,003, dated February 16, 1897.

Application filed February 1, 1894. Renewed November 3, 1896. Serial No. 612,041. (No model.) Patented in New Zealand February 9, 1893, No. 6,039; in New South Wales May 16, 1893, No. 4,261; in Victoria September 19, 1893, No. 10,831, and in England January 15, 1894, No. 903.

*To all whom it may concern:*

Be it known that I, GEORGE MONTAGUE BOWSER, a subject of the Queen of Great Britain and Ireland, and a resident of Harcourt Street, Brisbane, in the Colony of Queensland, have invented a certain new and useful invention entitled Improvements in Machinery for Molding and Dressing Stone Used for Building, Drainage, and other Analogous Purposes, (for which I have obtained patents in New Zealand, No. 6,039, bearing date February 9, 1893; in New South Wales, No. 4,261, bearing date May 16, 1893; in Victoria, No. 10,831, bearing date September 19, 1893, and in Great Britain, No. 903, bearing date January 15, 1894,) of which the following is a specification.

Figure 1:
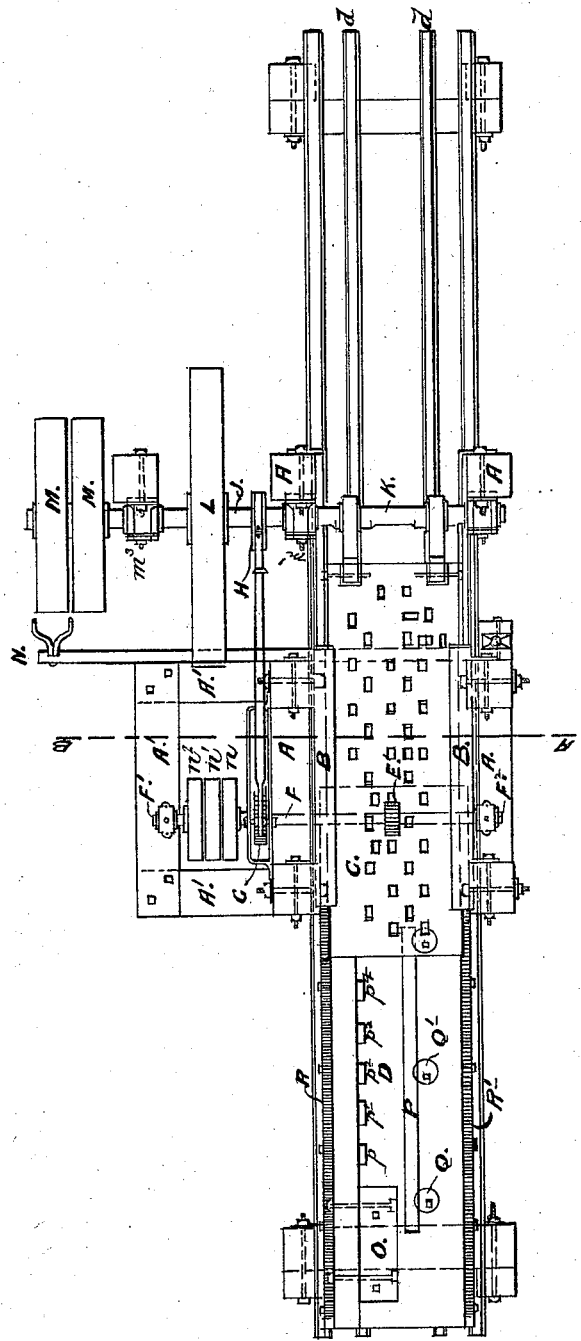
Figure 3:
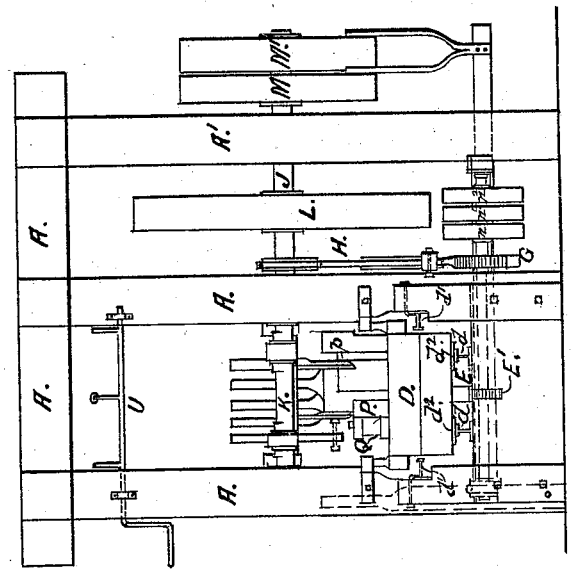
Figure 2:
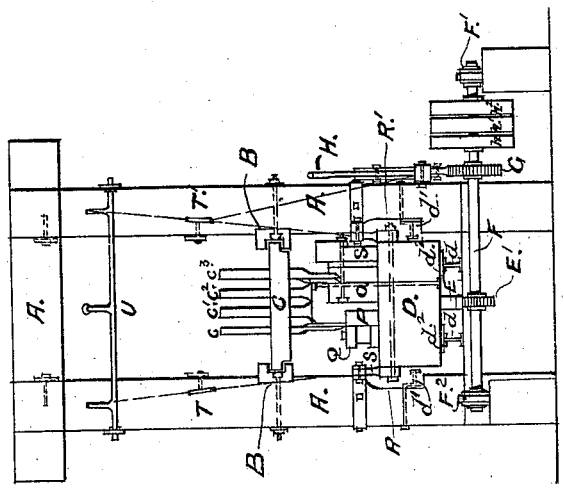

The object of my invention is to provide a machine for molding and dressing stone in a more efficient manner and at a considerable less cost than can possibly be done by manual labor, and dispensing with rubbing in molded work, as is the usual practice when stone is dressed by hand, and is described as follows, together with the accompanying drawings, Figures 1 to 4:

Referring to the drawings which form a part of this specification, Fig. 1 represents plan of machine; Fig. 2, a sectional elevation on line A B, Fig. 1; Fig. 3, an end elevation, and Fig. 4 a side elevation.

The letters of reference apply to corresponding parts in all figures.

A is a wooden frame bolted or otherwise securely fastened together. To this frame are bolted slides B of wrought or cast iron or other suitable metal.

C is an iron tool-chest working in slides B and having a number of holes, as shown, in which are fixed by suitable means the necessary cutting-tools for dressing and molding the stone to be operated upon.

The cutting-tools are made of iron and steel, or steel only, properly tempered, and can be made of any desired shape to suit the particular-shaped molding required, either for cornices, copings, architraves, channels, &c., and by the introduction of suitable tools the top and both sides of a stone can be dressed at one operation.

C and C' to $C^8$ show tools in position for work, of which there may be any number; D, stone-carriage, of solid timber or timbers, traveling on tram-rails $d$ and supported on each side by guide-rails $d'$. Underneath the center of the carriage is a rack E, running the whole length and geared into the cog-wheel E' on shaft F, supported on either end by pedestals F' and $F^2$; G, ratchet-wheel, driven by eccentric H from main shaft J by pawl $h$, connected therewith by connecting-bar $h'$.

The ratchet-wheel G is for propelling the stone-carriage forward as the tool-chest recedes, as hereinafter explained.

K is part of main shaft J, on which are fixed two eccentrics $k$, connected to the tool-chest C for imparting to the same a short reciprocating motion, thereby causing the tools to operate on the stone.

As the tool-chest is drawn back by the eccentrics $k$ the stone-carriage D is propelled forward ready for receiving contact with the cutting-tools by succeeding forward motion of tool-chest.

L is a fly-wheel; M and M', fast and loose pulleys on main driving-shaft J; N, driving-belt lever and fork. $n$, $n'$, and $n^2$ are two loose and one fast pulleys on shaft F, driven by cross and straight belts direct from primary motor or from counter-shaft, according to the convenience of circumstances. This gearing is for running the carriage backward or forward quickly when the stone is not being operated upon.

O is a stop block or buffer, made either of iron or wood iron-faced and iron-bound, bolted to stone-carriage D, against which the end of the stone to be dressed abuts.

Q, Q', and $Q^2$ are iron eccentric chocks with projecting square end at top and projecting round end at bottom fitting into round hole in bed of stone-carriage D. These are for securely fastening stone to be operated upon in stone-carriage, are quick in action, and most effective.

P is a piece of hard wood movable at will, and $p'$, $p^2$, $p^3$, $p^4$, and $p^5$ battens of hard wood secured to stone-carriage D. The stone to be dressed or molded is placed against these battens. The piece of hard wood is placed against the opposite side and tightened up by means of the eccentric chocks Q, Q', and $Q^2$ with a spanner. The clippings from the stone fall into the recesses formed by the battens $p'$, $p^2$, $p^3$, $p^4$, and $p^5$ and removed when necessary.

R and R' are iron ratchet-bars bolted or otherwise secured to each side of the stone-carriage D; S S' to $S^5$, steel pawls (of which there may be any number) suspended by cords or chains, as shown, attached to iron rings T and T', which are connected by cords or chains to set of crank-levers U, which are for the purpose of raising and lowering the pawls. These pawls, of which there are two sets, one set to each side of the machine, fall into the ratchet-bars R and R' and prevent the stone-carriage D from rebounding when the stone being operated upon comes into contact with the cutting-tools by the forward motion of the tool-chest C.

The set of crank-levers U actuates the pawl $h$ and when raised releases the pawl $h$ from ratchet-wheel G, which immediately stops the stone-carriage D from traveling forward.

Secured to the bottom of the stone-carriage D are two longitudinal slide-bars $d^2$, of flat iron, which rest upon the rails $d$. These are kept well greased to overcome friction.

I do not confine myself to any particular size, shape, or materials in the construction of my invention, so long as consistency be retained.

Having now described my invention, what I claim as new, and desire to secure by Letters Patent, is—

1. The combination in a machine for molding and dressing stone, of the character described, of the rectangular frame or slide secured thereto, a tool chest or holder mounted upon said slide, and provided with openings, adapted to receive the cutting-tools, a stone-carriage mounted on rails, a rack-bar beneath said stone-carriage, a cog-wheel carried by a transverse shaft mounted on the rectangular frame, and gearing with said rack, pawls connected by rings which are in turn connected by rods or chains to a set of crank-levers secured to said rectangular frame, and rack-bars adapted to engage therewith, substantially as shown and described.

2. The combination in a machine for molding and dressing stone of the character described, of the rectangular frame or slide secured thereto, the tool chest or holder mounted on said slide, and provided with openings adapted to receive the cutting-tools, a stone-carriage mounted on rails, a rack-bar beneath said stone-carriage, a cog-wheel carried by a transverse shaft mounted on the rectangular frame, and gearing with said rack, pawls connected by rings which are in turn connected by rods or chains, to a set of crank-levers secured to said rectangular frame, and rack-bars adapted to engage therewith, a double eccentric crank connected with the tool chest or holder and main shaft, whereby a reciprocating motion is imparted, ratchet-wheels in connection with cams or eccentrics upon the main shaft to propel the carriage of the tool chest or holder, and actuating mechanism for said box, substantially as described.

In witness whereof I have hereunto set my hand in presence of two witnesses.

GEORGE MONTAGUE BOWSER.

Witnesses:
  M. C. DALBY,
  E. GARLAND ABELL.